United States Patent Office 3,419,531
Patented Dec. 31, 1968

3,419,531
FLUORINE-CONTAINING POLYFORMALS
Floyd D. Trischler, San Diego, Calif., assignor to Whittaker Corporation, Los Angeles, Calif., a corporation of California
No Drawing. Filed June 3, 1966, Ser. No. 554,959
8 Claims. (Cl. 260—67)

ABSTRACT OF THE DISCLOSURE

This patent describes a novel fluorine-containing polymeric polyformals having the repeating unit —O—CH$_2$—O—CH$_2$—(CF$_2$)$_n$—CH$_2$— wherein $n$ is an integer of from about 3 to about 6 prepared by reacting trioxane with a diol having the formula HO—CH$_2$—(CF$_2$)$_n$—CH$_2$—OH These polymeric polyformals are useful directly for impervious coatings on metals and the like.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to novel fluorine-containing polyformals, and to their method of preparation.

Heretofore, it has been proposed to prepare polyformals by the reaction of various diols or thiols with cyclic acetals of the type:

wherein R is hydrogen or methyl and R' is hydrogen or some other radical, in the presence of an acid catalyst. The cyclic acetals of the above formula are prepared by reacting a diol of the formula:

HO—(CR$_2$)$_n$—OH with an aldehyde in accordance with the following equation:

The cyclic acetal is normally purified by distillation.

When the foregoing synthesis procedure was proposed for the preparation of fluorinated polyformals by the reaction of hexafluoropentanediol with dibutyl formal in the presence of anhydrous ferric chloride or p-toluene sulfonic acid, no polymeric fluorinated polyformal was obtained. However, according to the present invention there is provided a novel method whereby new fluorinated polyformals possessing many useful properties may be obtained.

Accordingly, it is a principal object of the present invention to provide a novel class of fluorinated polyformals.

Another object of the present invention is to provide a novel method for the preparation of fluorinated polyformals.

Yet another object of the present invention is the provision of novel polymeric materials possessing many valuable properties and utilities particularly in the field of coatings, laminating, and the like.

These and other objects of the present invention will be apparent from the more detailed description which follows.

Briefly, the present invention comprises the novel fluorine-containing polymeric polyformals having the following repeating unit:

—O—CH$_2$—O—CH$_2$—(CF$_2$)$_n$—CH$_2$— wherein $n$ is an integer of from 3 to about 6.

The invention includes the novel method of preparing these polyformals by reacting a fluorinated diol of the formula:

HO—CH$_2$—(CF$_2$)$_n$—CH$_2$—OH with trioxane in accordance with the following equation:

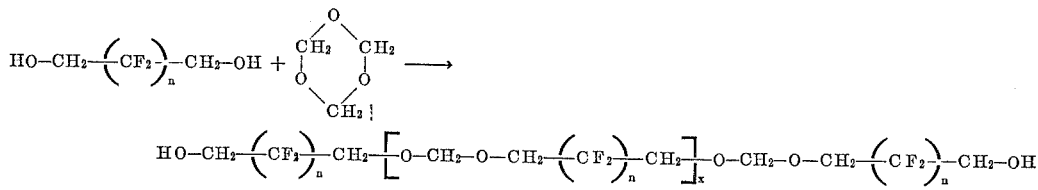

wherein $x$ is an integer of from 1 to about 50, and $n$ is as defined above.

The foregoing reaction proceeds in one step in high yields. The structure of the final product has been confirmed by both elemental analysis and infrared spectrum data.

The reaction of this invention is normally carried out in the presence of an effective catalytic amount of an acid catalyst, i.e., from about 0.1% to about 10% by weight of reactants, such as ferric chloride, p-toluenesulfonic acid, and the like.

No solvent is required in order to contact the diol, trioxane and catalyst. However, any inert solvent can be added to facilitate stirring where the reaction mass is very viscous. The reaction temperature is not critical and is usually within the range from about 60° to 150° C. Optionally, an inert blanket of nitrogen, argon or the like can be maintained over the reaction mass to minimize by-product formation. The polymeric polyformal is isolated and purified by conventional procedures, normally by washing and extraction. Any unreacted diol can be removed by distillation under vacuum.

The following example is presented solely to illustrate the invention and should not be regarded as limiting in any way. In the example the parts and percentages are by weight unless otherwise indicated.

Example

Into a 100 ml. three-necked flask were introduced 2,2,3,3,4,4-hexafluoro-1,5-pentanediol (53.0 g., 0.25 mole), trioxane (7.5 g., 0.083 mole) and p-toluensulfonic acid (1.5 g.). The flask was equipped with a stirrer, condenser, thermometer and nitrogen inlet. The ingredients were mixed for 17 hours at 100° C. to 120° C. under nitrogen. The polymer was cooled, then dissolved in ether. The ether solution was washed with 5% hydrogen peroxide containing 10 ml. of 10% sodium carbonate. It was then washed with water and the ether dried with potassium carbonate. The ether was removed to yield a clear, nearly colorless oil. The unreacted 2,2,3,3,4,4-hexafluoro-1,5-pentanediol was removed via vacuum distillation at 103° C. The yield was 56.7%. The molecular weight of the polymer as determined by vapor phase osmometry was 835±20. The polymer was hydroxyl terminated as indicated by the hydroxyl equivalent weight of 470.

Elemental analysis for $x=2$, $n=3$.—Calculated for $C_{23}H_{24}F_{24}O_8$: C, 31.30; H, 2.70; F, 51.60. Found: C, 31.30; H, 2.76; F, 51.34.

The foregoing example may be repeated using 2,2,3,3,4,4,5,5-octafluoro-1,6-hexanediol or other highly fluorinated diols of this type in lieu of 2,2,3,3,4,4-hexafluoro-1,5-pentanediol.

The p-toluenesulfonic acid can be replaced by ferric chloride or any similar acid catalyst of the type familiar to those skilled in the condensation polymer art.

The polymeric polyformals of my invention are useful directly for impervious coatings on metals and the like. The polymer may be applied to any base in melt or solution form. Since the polymers are soluble in ether, an ethereal solution represents a very convenient coating composition.

As is indicated above, the polymers of this invention are generally hydroxy terminated. However, other terminal groups can be provided by reaction by the addition of appropriate functional compounds. The hydroxy termination of the polymeric polyformals can also be utilized to advantage in the preparation of other polymers such as by reaction with acids and isocyanates. For example, the hydroxy terminated polyformals of this invention are useful as curing agents for isocyanate terminated polyether prepolymers such as Adiprene L-100 (by Dupont), an isocyanate terminated prepolymer having a molecular weight of 3000 and an NCO equivalent weight of 1000. Thus, when Adiprene L-100 (16.0 g., 0.016 equivalent) and the hydroxy terminated fluorine-containing polyformal of 665 molecular weight (5.0 g., 0.0132 equivalent) were mixed and cured for 2 hours at 250° F., a highly elastomeric solid useful as an adhesive, coating or laminating resin was obtained.

Those skilled in the art will readily appreciate that the plurality of carbon-to-fluorine bonds in the novel polymers of my invention render them of great value in any situation where chemical and heat stability is of importance.

Having fully described the invention, it is to be understood that the invention is not to be limited to the particulars above set forth, but rather is of the full scope of the appended claims and a lawful range of equivalents.

I claim:

1. Novel fluorine-containing polymeric polyformals consisting essentially of

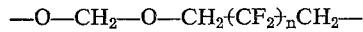

wherein $n$ is an integer of from 3 to about 6.

2. Novel fluorine-containing polymeric polyformals consisting essentially of

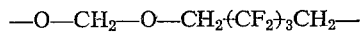

3. Novel hydroxy terminated fluorine-containing polymeric polyformals having the general formula

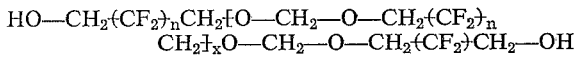

wherein $n$ is an integer of from 3 to about 6, and $x$ is an integer of from 1 to about 50.

4. Novel hydroxy terminated fluorine-containing polymeric polyformals having the general formula

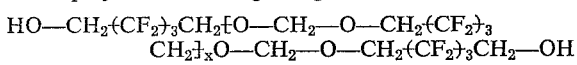

wherein $x$ is an integer of from 1 to about 50.

5. The method of preparing novel fluorine-containing polymeric polyformals having the repeating unit:

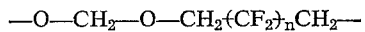

which comprises reacting in the presence of an effective catalytic amount of an acid catalyst trioxane with a diol of the formula

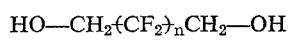

wherein in the above formulae, $n$ is an integer of from 3 to about 6.

6. The method of preparing novel fluorine-containing polymeric polyformals having the repeating unit:

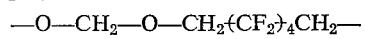

which comprises reacting in the presence of an effective catalytic amount of an acid catalyst trioxane with a diol of the formula

7. The method of claim 5 wherein the reaction is carried out under an inert gas blanket.

8. The method of claim 5 wherein the catalyst is p-toluenesulfonic acid.

References Cited

UNITED STATES PATENTS

| 2,864,780 | 12/1958 | Katz et al. | 260—67 XR |
| 2,870,097 | 1/1959 | Pattison | 260—67 XR |
| 2,911,390 | 11/1959 | Smith | 260—79.5 |

OTHER REFERENCES

Hill et al., American Chemical Society Journal, 57, 925–28 (1935).

Smith et al., Industrial and Engineering Chemistry, 49, 1241–6 (1957).

F. D. ANDERSON, *Primary Examiner.*

L. M. PHYNES, *Assistant Examiner.*

U.S. Cl. X.R.

260—338, 340, 633, 77.5, 615, 33.2, 858